United States Patent [19]

Sechrist et al.

[11] Patent Number: 5,338,440
[45] Date of Patent: Aug. 16, 1994

[54] CONTROLLED METHOD OF TRANSPORTING CATALYST BETWEEN ZONES

[75] Inventors: Paul A. Sechrist, Des Plaines; Roger R. Lawrence, Elmhurst; Larry D. Richardson, Roselle, all of Ill.

[73] Assignee: UOP, Des Plaines, Ill.

[21] Appl. No.: 998,331

[22] Filed: Dec. 30, 1992

[51] Int. Cl.$^5$ ............................................. C10G 35/10
[52] U.S. Cl. ...................................... 208/173; 208/174; 208/175
[58] Field of Search ........................ 208/173, 174, 175

[56] References Cited

U.S. PATENT DOCUMENTS 3,647,680 3/1972 Greenwood et al. ................ 208/65
3,839,196 10/1974 Plackmann et al. ................ 208/174
3,839,197 10/1974 Greenwood et al. ............... 208/174
3,856,662 12/1974 Greenwood .......................... 208/174

Primary Examiner—Helane Myers
Assistant Examiner—Walter D. Griffin
Attorney, Agent, or Firm—Thomas K. McBride; John G. Tolomei

[57] ABSTRACT

A controlled method of transporting catalyst between two zones while inhibiting communication between the atmospheres of the zones is disclosed. Communication between the zones is inhibited by controlling pressure differences. The two zones are separated by a means to lift catalyst, which results in a savings in construction costs. This invention is adaptable to a multitude of processes for the catalytic conversion of hydrocarbons in which deactivated catalyst particles are regenerated.

20 Claims, 2 Drawing Sheets

CONTROLLED METHOD OF TRANSPORTING CATALYST BETWEEN ZONES

FIELD OF THE INVENTION

The present invention is directed toward an improved means and method for effecting the conversion of a hydrocarbon-containing reactant stream in a catalytic reaction system. The broad field of the present invention is the multitude of processes wherein solid particles are transferred between any two zones which contain fluids that must be inhibited from communication. The narrow field of the present invention is a controlled method of transferring catalyst particles from a reaction zone to a regeneration zone of one such process.

BACKGROUND OF THE INVENTION

Catalytic processes for the conversion of hydrocarbons are well known and extensively used. Invariably the catalysts used in these processes become deactivated for one or more reasons. Where the accumulation of coke deposits causes the deactivation, reconditioning of the catalyst to remove coke deposits helps restore the activity of the catalyst. Coke is normally removed from catalyst by contact of the coke-containing catalyst at high temperature with an oxygen-containing gas to combust and remove the coke in a regeneration process. These processes can be carried out in-situ or the catalyst may be removed from a vessel in which the hydrocarbon conversion takes place and transported to a separate regeneration zone for coke removal. Arrangements for continuously or semi-continuously removing catalyst particles from a reaction zone and for coke removal in a regeneration zone are well known.

In order to transport catalyst from a reaction zone containing hydrocarbons to a regeneration zone containing oxygen, the two zones are ordinarily connected by a pipeline. The two zones generally operate at different pressures and contain different fluids which preferably are inhibited from communicating with one another. Communication between the two zones through the connecting pipeline can be inhibited by closing valves in the line, but this also stops the flow of catalyst between the zones. Besides, valves that close in pipelines containing flowing catalyst are generally maintenance problems, because of leakage due to wear from catalyst particles and malfunction due to high temperatures.

Communication between the two zones can also be inhibited by introducing an inert fluid into the connecting pipeline while catalyst flows between the zones. The inert fluid is generally introduced into a section of the pipeline at a pressure higher than the pressures of the two zones. Beginning at the point of introduction of the inert fluid, two portions of the inert fluid flow through the pipeline in opposite directions—one portion toward one zone and the other toward the other zone. Therefore, relative to the flow of the inert fluid, in one leg of the connecting pipeline catalyst flows countercurrently whereas in the other leg catalyst flows concurrently.

One drawback associated with the introduction of an inert fluid into the connecting pipeline between two zones is the length of the legs of the connecting pipeline. The length of the legs is determined by the dual design criteria of inhibiting communication and preventing the flow of inert fluid from neither overly hindering nor overly assisting the catalyst flow through the legs. As an illustration, for a vertically-disposed and moderately-sized hydrocarbon conversion reaction vessel with one connecting pipeline on its catalyst outlet, the height of the superstructure that supports the vessel and the connecting pipeline may be 50–100% taller than the superstructure of the vessel without a connecting pipeline. When a second connecting pipeline is also employed—e.g., on the catalyst inlet—the height and cost of the superstructure are compounded.

INFORMATION DISCLOSURE

U.S. Pat. No. 3,839,197 shows a process for transferring catalyst particles through a plurality of reaction zones in a multiple-stage, catalytic reaction system. U.S. Pat. No. 3,647,680 teaches a method that employs a lock hopper to transfer catalyst particles between a reaction zone and a regeneration zone.

BRIEF SUMMARY OF THE INVENTION

The present invention is a method of transferring solid particles between two zones while inhibiting communication between the fluids of the two zones. The method does not require either a lock hopper or valves in the connecting pipeline between the two zones. The connecting piping has two legs that are separated by a lift system. Consequently, where the two zones are in a side-by-side relation to each other in separate supporting superstructures, one of the legs of the connecting pipeline may be placed under one zone in one superstructure and the other leg may be either incorporated into the lift conduit or placed above the second zone in the second superstructure. As a result, the height of one of the two superstructures may be reduced by the height of one of the legs of the connecting pipeline, for a substantial savings in construction costs.

The present invention is in one of its broad aspects a method of transferring catalyst particles while inhibiting communication between two zones by making alterations to the arrangement of the connecting piping between the two zones that reduce construction costs.

Accordingly, in a broad embodiment, the present invention is a method of transferring solid particles in at least semi-continuous flow from a first zone containing a first fluid to a second zone containing a second fluid while inhibiting communication of the fluids of the first and second zones. The present invention withdraws an effluent stream comprising solid particles and the first fluid from the first zone by gravity-flow. The effluent stream passes into a purge zone, and a purged effluent stream comprising solid particles passes from the purge zone and into a lift zone. A transport stream comprising a lift fluid passes into the lift zone. A purge stream comprising the lift fluid passes from the lift zone and through the purge zone countercurrent to the effluent stream at a rate that is not less than that effective to purge the first fluid from the total void volume in the purge zone and less than that effective to terminate the flow of solid particles through the purge zone. A purge zone exit stream comprising the first fluid and the lift fluid passes from the purge zone and into the first zone, and a first stream comprising the lift fluid is rejected from the first zone. A lift stream comprising the lift fluid and the solid particles passes out of the lift zone. The velocity of the lift fluid is effective to lift the solid particles out of the lift zone and into a lift conduit. The lift stream passes through the lift conduit and into the second zone. A second stream comprising the lift fluid is rejected from the second zone.

In a second, more limited embodiment, the present invention is a method of transferring solid particles in at least semi-continuous flow from a first zone containing a first fluid to a second zone containing a second fluid while inhibiting communication of the fluids of the first and second zones. The present invention withdraws an effluent stream comprising solid particles and the first fluid from the first zone by gravity-flow. The effluent stream passes into a purge zone, and a purged effluent stream comprising solid particles passes from the purge zone and into a lift zone. A transport stream comprising a lift fluid passes into the lift zone. A purge stream comprising the lift fluid passes from the lift zone and through the purge zone countercurrent to the effluent stream at a rate that is not less than that effective to purge the first fluid from the total void volume in the purge zone and less than that effective to terminate the flow of solid particles through the purge zone. A purge zone exit stream comprising the first fluid and the lift fluid passes from the purge zone and into the first zone, and a first stream comprising the lift fluid is rejected from the first zone. A lift stream comprising the lift fluid and the solid particles passes out of the lift zone. The velocity of the lift fluid is effective to lift the solid particles out of the lift zone and into a lift conduit. The lift stream passes through the lift conduit and into a third zone. An outlet stream comprising solid particles passes from the third zone and into the second zone. Either a third stream comprising the lift fluid is rejected from the third zone or a second stream comprising the lift fluid is rejected from the second zone, or both.

In a preferred embodiment, the present invention is a method of transferring catalyst particles in at least semi-continuous flow from a first zone containing a first fluid comprising at least one of hydrogen and a hydrocarbon to a second zone containing a second fluid comprising oxygen while inhibiting communication of the fluids of the first and second zones. The present invention withdraws an effluent stream comprising catalyst particles and at least one of hydrogen and a hydrocarbon from the first zone by gravity-flow. The effluent stream passes into a purge zone, and a purged effluent stream comprising catalyst particles passes from the purge zone and into a lift zone. A transport stream comprising nitrogen passes into the lift zone. A purge stream comprising nitrogen passes from the lift zone and through the purge zone countercurrent to the effluent stream at a rate that is not less than that effective to purge at least one of hydrogen and a hydrocarbon from the total void volume in the purge zone and less than that effective to terminate the flow of catalyst particles through the purge zone. A purge zone exit stream comprising at least one of hydrogen and a hydrocarbon and nitrogen passes from the purge zone and into the first zone, and a first stream comprising nitrogen is rejected from the first zone. A lift stream comprising nitrogen passes out of the lift zone. The velocity of nitrogen is effective to lift the catalyst particles out of the lift zone and into a lift conduit. The lift stream passes through the lift conduit and into a fluid-solid disengaging zone. The fluid-solid disengaging zone operates at conditions effective to separate the entering lift stream into a third stream comprising nitrogen and an outlet stream comprising catalyst particles and nitrogen. The outlet stream is withdrawn from the fluid-solid disengaging zone and passes through a withdrawal conduit and into the second zone. At least intermittently, a moving packed bed of catalyst particles is formed in the withdrawal conduit. A second stream comprising nitrogen is rejected from the second zone. A portion of the third stream combines with a make-up gas stream that is at conditions including a flow rate and that comprises nitrogen to form a first process stream. The first process stream combines with a surge stream to form a second process stream. The second process stream is compressed and separated into two portions. A first portion of the compressed second process stream forms the transport stream. A second portion of the compressed second process stream is passed at least intermittently into a surge zone. The surge stream passes at least intermittently from the surge zone so that the flow rate of the make-up stream is substantially constant.

Other objects, embodiments, and details of the present invention are presented in the following detailed description of the invention.

BRIEF DESCRIPTION OF THE DRAWING

The drawings are simplified schematic flow diagrams of the controlled method of transporting catalyst particles in which only those lines, valves, etc., relevant to the flow of catalyst particles are shown.

DETAILED DESCRIPTION OF THE INVENTION

Figure 1:
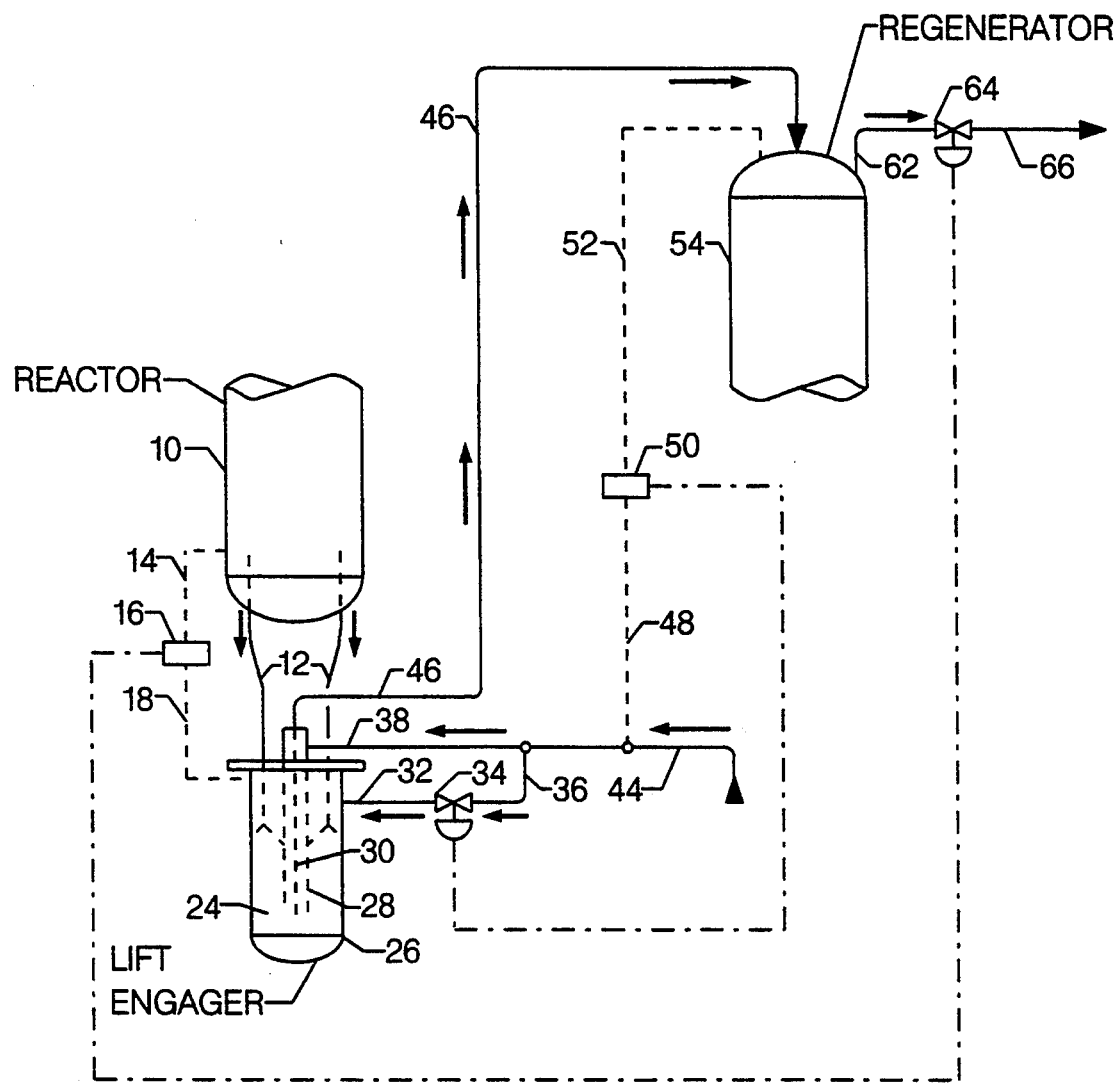
FIG. 1 is a schematic flow diagram of a broad embodiment of the present invention.

In its broadest terms, the present invention can be used in a multitude of processes to transfer catalyst between any two zones which contain fluids that are preferably inhibited from communication. One such application that requires inhibited communication between the fluids of two zones is the transfer of catalyst between a hydrocarbon-containing reaction zone and an oxygen-containing regeneration zone. In this application, inhibiting communication is necessary because the fluids of the two zones could react with each other to form water. The presence of water in either the reaction zone or the regeneration zone affects the performance of many hydrocarbon conversion catalysts.

Such systems having a hydrocarbon-containing reaction zone and an oxygen-containing regeneration zone, as applied to petroleum refining, may be employed in a wide variety of hydrocarbon conversion reactions including catalytic reforming, fixed-bed alkylation, hydrorefining, hydrocracking, dehydrogenation, hydrogenation, steam reforming, etc. The catalysts used in these processes are maintained in one or more hydrocarbon-containing reaction zones. Over time, the catalyst in the reaction zone(s) generally becomes deactivated because of the accumulation of coke deposits. Regeneration of the catalyst to remove the coke deposits helps restore the activity of the catalyst. Coke deposits are generally removed from the catalyst by contacting the catalyst with an oxygen-containing gas to combust and remove the coke in a regeneration zone. Many of these processes use a reaction zone and a regeneration zone in side-by-side relation to each other. In these systems, the catalyst is continuously or semi-continuously removed from the reaction zone and transferred to the regeneration zone for coke removal. Following coke removal, the catalyst is removed from the regeneration zone and transferred back to the reaction zone.

Therefore, in these well-known and widely-practiced systems, there is a requirement to transfer the catalyst back and forth between a hydrocarbon-containing zone and an oxygen-containing zone without communication or cross-mixing of the atmospheres of the two zones.

The most widely practiced hydrocarbon conversion process to which the present invention is applicable is catalytic reforming. Therefore the discussion herein of the present invention will be in reference to its application to a catalytic reforming reaction system. It is not intended that this discussion limit the scope of the present invention as set forth in the claims.

Catalytic reforming is a well-established hydrocarbon conversion process employed in the petroleum refining industry for improving the octane quality of hydrocarbon feedstocks, the primary product of reforming being motor gasoline. The art of catalytic reforming is well known and does not require detailed description herein.

Briefly, in catalytic reforming, a feedstock is admixed with a recycle stream comprising hydrogen and contacted with catalyst in a reaction zone. The usual feedstock for catalytic reforming is a petroleum fraction known as naphtha and having an initial boiling point of about 180° F. (80° C.) and an end boiling point of about 400° F. (205° C.). The catalytic reforming process is particularly applicable to the treatment of straight run gasolines comprised of relatively large concentrations of naphthenic and substantially straight chain paraffinic hydrocarbons, which are subject to aromatization through dehydrogenation and/or cyclization reactions.

Reforming may be defined as the total effect produced by dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. Further information on reforming processes may be found in, for example, U.S. Pat. Nos. 4,119,526 (Peters et al.); 4,409,095 (Peters); and 4,440,626 (Winter et al.).

A catalytic reforming reaction is normally effected in the presence of catalyst particles comprised of one or more Group VIII noble metals (e.g., platinum, iridium, rhodium, palladium) and a halogen combined with a porous carrier, such as a refractory inorganic oxide. The halogen is normally chlorine. Alumina is a commonly used carrier. The particles are usually spheroidal and have a diameter of from about 1/16th to about ⅛th inch (1.5–3.1 mm), though they may be as large as ¼th inch (6.35 mm). In a particular reaction-regeneration system, however, it is desirable to use catalyst particles which fall in a relatively narrow size range. A preferred catalyst particle diameter is 1/16th inch (3.1 mm). During the course of a reforming reaction, catalyst particles become deactivated as a result of mechanisms such as the deposition of coke on the particles; that is, after a period of time in use, the ability of catalyst particles to promote reforming reactions decreases to the point that the catalyst is no longer useful. The catalyst must be reconditioned, or regenerated, before it can be reused in a reforming process.

In a preferred form, the reformer will employ a moving bed reaction zone and regeneration zone. The present invention is applicable to a moving bed regeneration zone and a fixed bed regeneration zone. Fresh catalyst particles are fed to a reaction zone, which may be comprised of several subzones, and the particles flow through the zone by gravity. Catalyst is withdrawn from the bottom of the reaction zone and transported to a regeneration zone where a multi-step regeneration process is used to remove the coke deposits and recondition the catalyst to restore its full reaction promoting ability. The art of moving bed regeneration zones is well known and does not require detailed description herein. What is important is that the regeneration zone contains oxygen and generally operates in excess of 700° F. (370° C.). Catalyst flows by gravity through the various regeneration steps and then is withdrawn from the regeneration zone and furnished to the reaction zone. Catalyst that is withdrawn from the regeneration zone is termed regenerated catalyst. Movement of catalyst through the zones is often referred to as continuous though, in practice, it may be semi-continuous. By semi-continuous movement is meant the repeated transfer of relatively small amounts of catalyst at closely spaced points in time. For example, one batch per minute may be withdrawn from the bottom of a reaction zone and withdrawal may take one-half minute, that is, catalyst will flow for one-half minute. If the inventory in the reaction zone is large, the catalyst bed may be considered to be continuously moving. A moving bed system has the advantage of maintaining production while the catalyst is removed or replaced.

The majority of the description of the present invention is presented in terms of transferring catalyst from a reaction zone containing hydrocarbon to a regeneration zone containing oxygen using nitrogen as a lift fluid. However, this description is not intended to limit the scope of the invention in any way.

FIG. 1 shows the present invention in its broad embodiment. Referring to FIG. 1, the catalyst transport system of the present invention is shown in a reaction system where the reaction zone 10 and the regeneration zone 54 are in a preferred, side-by-side relation. The reaction zone 10 may be maintained independently with its own atmosphere and at its own pressure by any suitable means, and such means are not essential elements of the present invention. An effluent stream comprising catalyst particles and hydrocarbon is withdrawn from the reaction zone 10 and introduced into a purge zone 12. The purge zone 12 serves the function of purging the hydrogen and hydrocarbon from the catalyst particles. Although the purge zone may comprise a variety of different shapes and internal baffles to help ensure adequate purging, in its simplest form the purge zone consists of one or more catalyst-withdrawal conduits 12, as shown in FIG. 1. The effluent stream flows down through the catalyst-withdrawal conduits 12 and countercurrent to a purge stream that flows up from the lift zone 26. A purged effluent stream comprising catalyst particles is withdrawn from the catalyst-withdrawal conduits 12 and passed into the upper portion of a lift zone 26. This lift zone 26 transports catalyst particles to the regeneration zone 54. The lift zone 26 may be one of a variety of configurations that are well-known to those skilled in the art of particle transport. One class of such lift zone includes lift-engagers. In the present invention, the preferred lift-engager also serves the function of controlling the rate of catalyst transport out of the lift-engager.

Although a variety of means are known to those skilled in the art of particle transport for controlling the rate of catalyst transport out of a lift-engager, a preferred lift zone is shown in FIG. 1. The preferred lift engager 26 contains an imperforate centerpipe 28 through the center of which a concentric lift line 30 is disposed. The annular space created between the centerpipe 28 and the interior wall of the lift-engager 26 is a volume of catalyst 24 into which the catalyst-withdrawal conduits 12 discharge. This volume 24 is filled with catalyst up to the level of the discharge ends of the catalyst-withdrawal conduits 12.

Associated with the preferred lift engager is a preferred means of introducing a fluid transport stream into the lift engager. This is shown in FIG. 1. The fluid transport stream comprising nitrogen passes through a line 44 and is separated into two portions, each of which passes separately into the lift-engager 26. A primary portion of the transport stream enters the lift-engager 26 through a line 38 and flows downwardly into the annular space formed by the centerpipe 28 and the concentric lift line 30 disposed therein. A secondary portion of the transport stream enters the lift-engager 26 through a line 36, control valve 34, and a line 32 into the annular space created between the centerpipe 28 and the interior wall of the lift-engager 26, and above the level of the catalyst volume 24 in the lift-engager 26. The two portions of the transport stream effect lifting of the catalyst particles from the bottom of the lift-engager 26 upwardly through the inner concentric lift line 30 and out of the lift-engager 26. This lifting system with its method of introducing the transport gas as two separate portions into the lift-engager 26 is well known to those skilled in the art of particle transport and its operation need not be described here in detail. What is important is that varying the proportion of the transport stream that is the secondary portion is an effective means of regulating the rate of catalyst transport out of the lift-engager 26. This can be accomplished by maintaining a constant the total flow rate of transport gas through the line 44 and varying the flow rate of the secondary portion through the lines 36 and 32 using the valve 34. The present invention is not limited to the lift zone shown in the drawings, and any suitable lift zone may be used.

The purge stream comprising nitrogen passes from the lift-engager 26, through the catalyst-withdrawal conduits 12, and into the reaction zone 10. The purge stream passes into the reaction zone 10 countercurrently to the flow of catalyst through the catalyst-withdrawal conduits 12. The flow rate of the purge stream up through the catalyst-withdrawal conduits 12 is at a rate less than that effective to terminate the flow of catalyst particles through the catalyst-withdrawal conduits 12, thereby allowing the catalyst particles to flow at least intermittently through the catalyst-withdrawal conduits 12. In addition, the flow rate of the purge stream is not less than that effective to purge hydrogen and hydrocarbon from the total void volume in the catalyst-withdrawal conduits 12. The total void volume in the catalyst-withdrawal conduits 12 is defined as the volume of the pores within the catalyst particles plus the voidage volume between the catalyst particles in the catalyst-withdrawal conduits 12. The physical characteristics of the catalyst determine the volume of the pores within the catalyst particles, and the voidage volume between the catalyst depends on how densely the catalyst particles are packed in the catalyst-withdrawal conduits 12. Since the rate at which the total void volume enters the catalyst-withdrawal conduits depends on the rate of flow of the catalyst particles, the flow rate of the purge stream that is effective to purge hydrocarbon from the total void volume depends on the rate of flow of the effluent stream. Preferably, the residence time of the catalyst particles in the purge zone is between 0.1 and 60 minutes. A purge zone exit stream comprising nitrogen and hydrocarbon is passed from the top ends of the catalyst withdrawal conduits 12 and into the reaction zone 10. The nitrogen is ultimately rejected from the reaction zone 10 in any suitable stream, typically the reaction products effluent stream.

One consequence of the flow of the purge stream from the lift zone 26 through the catalyst-withdrawal conduits 12 into the reaction zone 10 is that the lift zone operates at a lifting pressure that is not less than the pressure of the reaction zone 10. The lifting pressure is preferably not less than 2 inches $H_2O$ greater than the reactor pressure. The pressure difference between the reaction zone 10 and the lift-engager 26 is measured by a differential pressure measuring device 16 that is in communication with the reaction zone 10 through a pressure tap 14 and with the lift-engager 26 through a pressure tap 18.

The lift stream, which is generally much greater in volumetric flow than the purge stream, also passes out of the lift-engager 26. The lift stream transports the catalyst particles from the lift-engager 26, through the lift conduit 46, and into the regenerator 54. As a result of the flow of the lift stream from the lift-engager 26, through the lift conduit 46, and into the regenerator 54, the pressure of the regenerator 54 is less than the lifting pressure. The regenerator pressure is preferably not less than 10 inches $H_2O$ less than the lifting pressure. The pressure difference between the lift-engager 26 and the regenerator 54 is measured by a differential pressure measuring device 50 that is in communication with the lift-engager 26 through a pressure tap 48, the line 44, and the line 38 and with the regenerator 54 through a pressure tap 52.

In a more limited aspect of this broad embodiment of the invention, these two pressure differences—one across the catalyst-withdrawal conduits 12 and the other across the lift conduit 46—are maintained at or near to their desired values by a control system, as shown in FIG. 1. In this aspect, the pressure difference between the lift-engager 26 and the reactor 10 is regulated at its desired value by adjusting the position of a control valve 64, which regulates the flow of a vent stream comprising nitrogen that entered the regenerator 54 with the lift stream. The vent stream exits from the regenerator 54 through a line 62, the control valve 64, and a line 66. Typically, this vent stream is the flue gas from the regenerator 54. In this aspect, when, as a result of any of a number of process reasons, the pressure difference between the lift-engager 26 and the reactor 10 increases above its desired value, the open position of the control valve 64 is increased, thereby increasing the flow of the vent gas stream from the regenerator 54 and ultimately decreasing the pressure difference to its desired value. The explanation for this is that increasing the vent gas flow out of the regenerator 54 decreases not only the pressure of the regenerator 54 but also the pressure of the lift-engager 26, because the lift-engager 26 and the regenerator 54 are in communication by the flow of gas through the lift conduit 46. Conversely, when the pressure difference between the lift-engager 26 and the reactor 10 decreases below its desired value, the open position of the control valve 64 is decreased, thereby decreasing the flow of the vent gas stream from the regenerator 54 and ultimately increasing the pressure difference to its desired value.

Thus, in this aspect of the invention, control of the flow of the vent gas from the regenerator 54 through the control valve 64 is sufficient to control the pressure difference between the lift engager 26 and the reactor 10.

In this aspect of the invention, the total flow rate of the transport stream to the lift-engager 26 is sufficient to allow both the purge stream and the lift stream to pass from the lift-engager 26 at their desired rates. The purge stream is passed from the lift-engager 26 at a rate that is not less than that effective to purge the first fluid from the total void volume in the catalyst-withdrawal conduits 12 and less than that effective to terminate the flow of catalyst particles through the catalyst-withdrawal conduits 12. The lift stream is passed from the lift-engager 26 at a velocity effective to lift the catalyst particles out of the lift-engager 26. Thus, in this aspect of the invention, the total flow rate of the transport stream to the lift-engager 26 is sufficient to control both the pressure difference between the lift-engager 26 and the reactor 10 as well as the velocity of the lift stream out of the lift-engager 26.

In another aspect of the control system shown in FIG. 1, the pressure difference between the lift-engager 26 and the regenerator 54 is regulated at its desired value by adjusting the position of the control valve 34 of the secondary portion of the fluid transport stream. In this aspect, when, as a result of any of a number of process reasons, the pressure difference between the lift-engager 26 and the regenerator 54 increases above its desired value, the open position of the control valve 34 is decreased, thereby decreasing the flow of the secondary portion of the fluid transport stream into the lift-engager 26 and ultimately decreasing the pressure difference to its desired value. The explanation for this response is that varying the proportion of the transport stream that is the secondary portion regulates not only the rate of catalyst transport out of the lift-engager 26 as described previously but also the pressure drop across the lift conduit 46, because the pressure drop varies directly with the rate of catalyst transport. Conversely, when the pressure difference between the lift-engager 26 and the regenerator 54 decreases below its desired value, the open position of the control valve 34 is increased, thereby increasing the flow of the secondary portion of the fluid transport stream into the lift-engager 26 and ultimately increasing the pressure difference to its desired value. Thus, in this aspect of the invention, the flow rate of the secondary portion of the fluid transport stream to the lift-engager 26 is sufficient to control both the pressure difference between the lift-engager 26 and the regenerator 54 as well as the rate of catalyst transport out of the lift-engager 26.

Since catalyst transport may be semi-continuous, the lift stream may contain catalyst particles intermittently. Consequently, in order to minimize waste of transport gas, the flow rate of the lift stream out of the lift-engager 26 need not be continuously at a velocity effective to lift the catalyst particles out of the lift-engager 26. Instead, the flow rate of the lift stream may be variable. For example, the flow rate of the lift stream may be at a relatively low rate when no catalyst particles are being lifted and at a relatively high rate when catalyst particles are being lifted. Since the pressure drop across the lift conduit 46 varies with the rate of catalyst transport, the pressure difference between the lift-engager 26 and the regenerator 54 may vary significantly between the periods when catalyst is being lifted and when catalyst is not being lifted. In any event, provided that the required pressure difference is maintained between the lift-engager 26 and the reactor 10, then communication between the reactor 10 and the regenerator 54 is inhibited as long as a required minimum pressure difference is also maintained between the lift-engager 26 and the regenerator 54. This pressure difference, which needs to be only a few inches of water across the lift conduit 46, can be achieved even when catalyst is not being transported using the control system in FIG. 1. Those skilled in the art of fluid and particle flow are able to design the lift conduit 46 so that it is suitable for lifting catalyst and for maintaining a required minimum pressure difference between the lift-engager 26 and the regenerator 54 when catalyst is not being lifted.

Preferably, the transport stream is gaseous and the lift fluid comprises nitrogen. Therefore, with respect to many hydrocarbon conversion processes employing a regeneration section, this transport stream is substantially inert at the conditions of both the reaction zone 10 and the regeneration zone 54. However, the present invention is not limited to lift fluids that are inert at the conditions of the reaction zone 10 and the regeneration zone 54. Since in the present invention, some lift fluid enters both the reaction zone 10 and the regeneration zone 54, any lift fluid is suitable, subject to the provision that it is not substantially detrimental to the performance of the zones as a result of its operating condition, such as its rate of entry, its temperature, or its concentration in each zone.

This broad embodiment has the important advantage of effectively eliminating one leg of the connecting pipeline between the reaction zone 10 and the regeneration zone 54. As described previously, a typical connecting pipeline between the two zones is divided at the point of introduction of the inert fluid into two legs. Relative to the flow of the inert fluid, the catalyst in one of the legs flows countercurrently and the catalyst in the other leg flows concurrently. Typically, the two legs are part of one long connecting pipeline between the two zones. However, in this broad embodiment, where the leg in which the catalyst flows countercurrently to the inert fluid is the catalyst-withdrawal conduits 12 between the reactor 10 and the lift-engager 26, the leg in which the catalyst flows cocurrently to the inert fluid is the lift conduit 46. Thus, the length of the catalyst-withdrawal conduits 12 are shorter than they would otherwise have been by the length of what the cocurrent leg would have been if it too were incorporated in the catalyst-withdrawal conduits 12. In effect, the cocurrent leg has been incorporated into the lift conduit 28, and the height requirement of a separate cocurrent leg has been eliminated. Consequently, this broad embodiment has the advantage of being particularly inexpensive in terms of invested capital and construction costs.

Generally, this broad embodiment is particularly useful in applications where the desired difference between the reactor pressure and the regenerator pressure happens to be approximately the same as the pressure drop across the lift conduit 46. Furthermore, this broad embodiment is suitable for applications where the supply of lift fluid is plentiful and inexpensive, because the flow of lift fluid through this embodiment is "once-through." In this context, "once-through" means that lift fluid that passes through the lift-engager 26, up the lift conduit 46, and into the regenerator 54 is generally not recycled back to the lift-engager 26 without special means for re-separating components of the fluid in the regenerator from the lift fluid. This is a necessary consequence of this embodiment because any lift fluid that enters the regenerator 54 is thereby contaminated by components such as oxygen of the fluid contained in the regenerator 54, which must be inhibited from communicating with the fluid of the reactor. If any gas that comprises lift fluid and oxygen, for example, were recycled back to the lift-engager 26, then the oxygen would communicate with the fluid of the reactor 10 by passage of the purge stream through the catalyst withdrawal conduits 12 and the entry of the purge zone exit stream into the reaction zone 10.

Other embodiments of the present invention have applications that are related to those of the broad embodiment described above. A second, more limited embodiment of the present invention has an additional zone included between the lift conduit and the regenerator. The catalyst entering this additional zone passes into the regenerator through a catalyst withdrawal conduit. This second embodiment has utility in a number of applications. Generally, one such application is where the desired difference in pressure between the reactor pressure and the regenerator pressure happens to be significantly higher than the typical pressure drop across the lift conduit. In this arrangement, the difference in pressure between the reactor pressure and the regenerator pressure that is in excess of the typical pressure drop across the lift conduit may be taken across the catalyst withdrawal conduit between the additional zone and the regenerator. Another application for this second embodiment of the present invention is where it is desirable not to pass all of the lift fluid into the regenerator. This may be the case where the flow rate of the lift fluid into the regenerator may be sufficiently high that process complications may arise in the regenerator. This may also be the case where the flow rate of lift fluid into the regenerator may require special or costly mechanical modifications to accommodate the high inflowing rate of gas. And, finally, this may also be the case where the lift fluid that enters the regenerator might be ultimately rejected from or otherwise be lost from the process, especially if the lift fluid is scarce or expensive.

Figure 2:
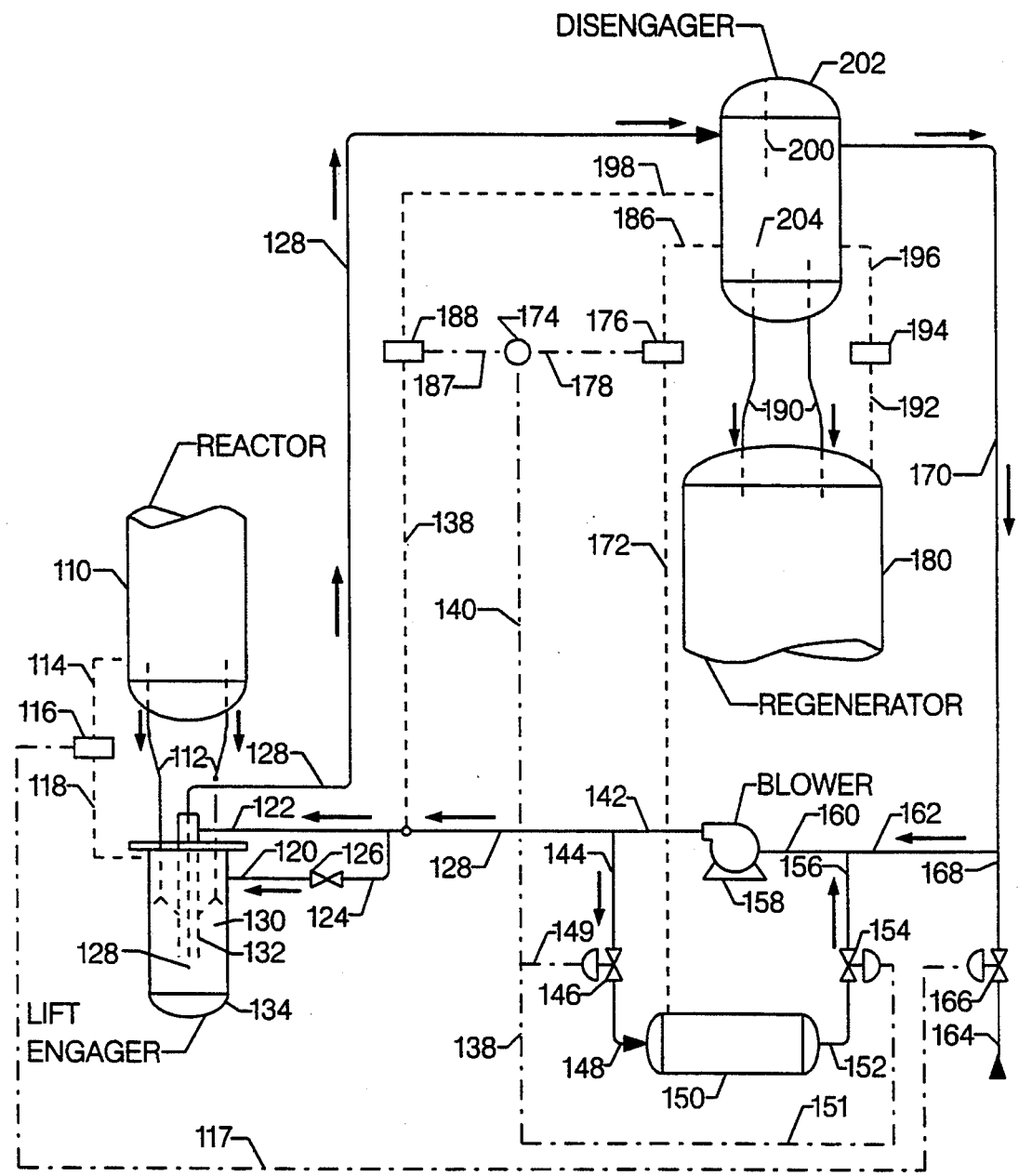
FIG. 2 is a schematic flow diagram of a preferred embodiment of the present invention.

FIG. 2 is a diagram that illustrates a preferred variation of this second embodiment of the present invention. Referring to FIG. 2, the catalyst transport system of the present invention is shown in a reaction system where the reaction zone 110 and the regeneration zone 180 are in a preferred, side-by-side relation. The reaction zone 110 and the regeneration zone 180 may be maintained independently with their respective atmospheres at their respective pressures by any suitable means, and such means are not essential elements of the present invention. An effluent stream comprising catalyst particles, hydrogen, and hydrocarbon is withdrawn from the reaction zone 110 and introduced into a purge zone, which may consist of one or more catalyst-withdrawal conduits 112, as shown in FIG. 2. The effluent stream comprising catalyst particles flows down through the catalyst-withdrawal conduits 112 and countercurrent to a purge stream that flows up from the lift zone, exemplified by a preferred lift-engager 134. A purged effluent stream comprising catalyst particles is withdrawn from the catalyst-withdrawal conduits 112 and passed into the upper portion of the lift-engager 134. The preferred lift-engager 134 contains an imperforate centerpipe 132 through the center of which a concentric lift line 128 is disposed. The annular space created between the centerpipe 132 and the interior wall of the lift-engager 134 is a volume of catalyst 130 into which the catalyst-withdrawal conduits 112 discharge. This volume 130 is filled with catalyst up to the level of the discharge ends of the catalyst-withdrawal conduits 112.

Associated with the preferred lift-engager is a preferred means of introducing a fluid transport stream into the lift-engager. The fluid transport stream comprising nitrogen passes through a line 128. The fluid transport stream is separated into two portions, each of which passes separately into the lift-engager 134. A primary portion of the transport stream enters the lift-engager 134 through a line 122 and flows downwardly into the annular space formed by the centerpipe 132 and the concentric lift line 128 disposed therein. A secondary portion of the transport stream enters the lift-engager 134 through a line 124 and a control valve 126 into the volume 130 and above the level of the catalyst in the lift-engager 134. The two portions of the transport stream effect lifting of the catalyst particles from the bottom of the lift-engager 134 upwardly through the inner concentric lift line 128 and out of the lift-engager 134. The present invention is not limited to the lift zone shown in the drawing, and any suitable lift zone may be used.

The purge stream comprising nitrogen is passes out of the lift-engager 134 and flows through the catalyst-withdrawal conduits 112 and into the reaction zone 110. The purge stream passes into the reaction zone 110 countercurrently to the flow of catalyst through the catalyst-withdrawal conduits 112. The flow rate of the purge stream up through the catalyst-withdrawal conduits 112 is at a rate less than that effective to terminate the flow of catalyst particles through the catalyst-withdrawal conduits 112, thereby allowing the catalyst particles to flow at least intermittently through the catalyst-withdrawal conduits 112. In addition, the flow rate of the purge stream is not less than that effective to purge hydrogen and hydrocarbon from the total void volume in the catalyst-withdrawal conduits 112. A purge zone exit stream comprising nitrogen, hydrogen, and hydrocarbon is passed from the top ends of the catalyst withdrawal conduits 112 and into the reaction zone 110. The nitrogen is ultimately rejected from the reaction zone 110 in any suitable stream, typically the reaction products effluent stream.

One consequence of the flow of the purge stream from the lift-engager 134 through the catalyst-withdrawal conduits 112 into the reaction zone 110 is that the lift-engager 134 operates at a lifting pressure that is not less than the pressure of the reaction zone 110. The lifting pressure is preferably not less than 2 inches $H_2O$ greater than the reactor pressure. The pressure difference between the reaction zone 110 and the lift-engager 134 is measured by a differential pressure measuring device 116 that is in communication with the reaction zone 110 through a pressure tap 114 and with the lift-engager 134 through a pressure tap 118.

The lift stream, which is generally much greater in volumetric flow than the purge stream, also passes from the lift-engager 134. The lift stream transports the catalyst particles from the lift engager 134, through the lift conduit 128, and into a disengaging zone 202, resulting in the pressure of the disengaging zone 202 being less than the lifting pressure. The pressure of the disengaging zone is preferably not less than 10 inches $H_2O$ less than the lifting pressure. The pressure difference between the lift-engager 134 and the disengaging zone 202 is measured by a differential pressure measuring device 188 that is in communication with the lift-engager 134 through a pressure tap 138, the line 128, and the line 122 and with the disengaging zone 202 through a pressure tap 198. The disengaging zone 202 serves the dual functions of receiving the entering lift stream from the lift conduit and producing an outlet particle stream comprising the catalyst particles which may pass through a transfer zone 190 and then passes into the regenerator 180. Consequently, this arrangement allows the disengaging zone 202 to operate at a pressure that is not necessarily the same pressure as the regenerator pressure.

The disengaging zone 202 may be one of a variety of configurations that are well-known to those skilled in the art of particle transport. One common type of disengaging zone is a fluid-solids disengaging zone, examples of which are well known. A disengaging zone separates the entering lift stream comprising lift fluid into two separate streams—a vent stream that comprises lift fluid and an outlet particle stream that comprises catalyst particles. The vent stream rejected from the disengaging zone may comprise some or all of the lift fluid entering the disengaging zone with the lift stream. Where the vent stream comprises some but not all of the lift fluid entering the disengaging zone, the remaining lift fluid that is not rejected from the disengaging zone exits the disengaging zone with the outlet particle stream.

However, the disengaging zone of the present invention is not limited to a disengaging zone. The disengaging zone may not produce a separate vent stream, but instead solely an outlet particle stream that comprises catalyst particles and lift fluid. In this arrangement, all of the lift fluid entering with the lift stream exits the disengaging zone with the catalyst particles in the outlet particle stream. The outlet particle stream may at least intermittently form a packed bed of catalyst particles or it may at least intermittently form a moving packed bed of catalyst particles. Those skilled in the art are able to design disengaging zones that produce an outlet particle stream comprising a packed bed or a moving packed bed of catalyst and none, some, or all of the lift fluid that enters with the lift stream.

A variety of means are known to those skilled in the art of particle transport for disengaging solids from gas. A disengaging zone 202 that is suitable for disengaging catalyst particles from nitrogen contains a vertically-disposed imperforate baffle 200, as shown in FIG. 2. The lift stream enters through the lift conduit 128 into the disengaging zone 202 on one side of the baffle 200. The space created below the bottom of the baffle 200 and the interior walls of the disengaging zone 202 is a volume 204 into which the entering catalyst particles fall. This volume 204 is filled with catalyst particles up to a level below the bottom of the baffle 200. The nitrogen disengages from the catalyst particles in the space above the catalyst level and exits from the disengaging zone 202 through a line 170.

An outlet particle stream comprising catalyst particles is withdrawn from the bottom of the disengaging zone 202 and introduced either directly into the regenerator 180 or into a transfer zone 190 and then into the regenerator 180. The outlet particle stream may comprise nitrogen, which may be either within the catalyst particles or between the catalyst particles, or both.

Where present, the transfer zone 190 serves the function of transferring the catalyst particles from the disengaging zone 202 to the regenerator 180. Although the transfer zone 190 may comprise a variety of different configurations to transfer the catalyst, in its simplest form the transfer zone consists of one or more catalyst-withdrawal conduits 190, as shown in FIG. 2. The catalyst particles flow down through the catalyst-withdrawal conduits 190 and a transferred outlet particle stream comprising catalyst particles is withdrawn from the catalyst withdrawal conduits 190 and passed into the upper portion of the regenerator 180.

A regenerator stream may flow from the regenerator 180 countercurrent to the flow of the outlet particle stream. In this arrangement, the regenerator stream comprising oxygen passes from the regenerator 180 and flows through the catalyst-withdrawal conduits 190 and into the disengaging zone 202. The flow rate of the regenerator stream up through the catalyst-withdrawal conduits 190 is at a rate less than that effective to terminate the flow of catalyst particles through the catalyst-withdrawal conduits 190, thereby allowing the catalyst particles to flow at least intermittently through the catalyst withdrawal conduits 190. A regenerator exit stream comprising oxygen is passed from the top ends of the catalyst-withdrawal conduits 190 and into the disengaging zone 202. The oxygen is ultimately rejected from the disengaging zone 202 in any suitable stream, typically the vent stream that exits the disengaging zone 202.

The disengaging zone 202 may be maintained at a disengaging pressure that is greater than, less than, or equal to the regenerator pressure. The pressure difference between the disengaging zone 202 and the regenerator 180 is measured by a differential pressure measuring device 194 that is in communication with the disengaging zone 202 through a pressure tap 196 and with the regenerator 180 through a pressure tap 192. Where the disengaging pressure is greater than the regenerator pressure, it is generally not less than 10 inches $H_2O$ greater than the regenerator pressure. Where the disengaging pressure is less than the regenerator pressure, then, as described previously, a regenerator stream flows from the regenerator 180 into the catalyst-withdrawal conduits 190 and a regenerator exit stream is passed from the top ends of the catalyst-withdrawal conduits 190 and passed into the disengaging zone 202. The oxygen present in the regenerator exit stream is ultimately rejected from the disengaging zone 202 with the vent stream. This contaminates the vent stream from the disengaging zone 202 with oxygen and other components of the regenerator fluid. Consequently, the lift fluid that vents from the disengaging zone 202 flows "once-through" the system and cannot be recycled to the lift-engager 134 as part of the transport stream without special means for reseparating the oxygen or other components of the regenerator fluid from the lift fluid. As described above, this is necessary to inhibit communication of the atmospheres of the reaction zone 110 and the regeneration zone 180 by means of contamination of the transport stream, which in turn results in the contamination of the purge stream that flows from the lift-engager 134 into the reaction zone 110. Operating the regenerator 180 at a pressure higher than the disengaging zone 202, may be preferred for economic reasons in some applications because a higher regenerator pressure generally results in a smaller and less expensive regenerator vessel.

As described previously, this second embodiment of the present invention is not limited to rejecting all of the lift fluid that enters the disengaging zone 202 from the disengaging zone 202. Some or all of the lift fluid may be passed with the outlet particle stream through the catalyst withdrawal conduits 190 and into the regenerator 180. The lift fluid that enters the regenerator 180 may be rejected or vented from the regenerator 180 by any suitable means. Typically, this vent stream is the flue gas from the regenerator. An especially useful and advantageous variation of the second embodiment of the present invention occurs where a vent stream comprising the lift fluid is passed from the disengaging zone 202 and the pressure of the disengaging zone 202 is greater than the regenerator pressure. In this variation, the vent stream from the disengaging zone 202 does not contain any components of the regenerator fluid. Consequently the lift fluid of the vent stream from the disengaging zone may be recycled to the lift-engager 134 without the risk of communication of the fluids of the reactor 110 and the regenerator 180. The transport stream comprises a portion of the vent stream from the disengaging zone 202. Recycling of the lift fluid is an economical choice where the lift fluid is scarce or expensive. Nevertheless, despite efforts to conserve and prevent loss of lift fluid from the transport stream/lift stream circuit, some lift fluid will exit the circuit into the reactor 110 by means of the purge stream through the catalyst-withdrawal conduits 112 between the lift-engager 134 and the reactor 110. In order to compensate for this loss of lift fluid, it will be necessary to introduce a make-up stream comprising the lift fluid into the transport stream/lift stream circuit. This make-up stream may be introduced at any convenient point in the circuit. Preferably, the point of introduction is either a pipeline or a vapor space of a vessel that does not contain catalyst particles so that the entering make-up gas stream does not adversely interfere with the flow of catalyst particles in the process. One such point of introduction is the pipeline 170 containing the vent stream from the disengaging zone 202 that is being recycled to the lift-engager 134 to form at least a part of the transport stream. Regardless of the point of introduction, the transport stream will comprise at least a portion of the make-up gas stream because the transport stream/lift stream circuit is a recirculating system.

The vent stream from the disengaging zone 202 may be recycled to the lift-engager 134 by any suitable means. Where the lift fluid is gaseous, a portion of the vent stream from the disengaging zone 202 may be compressed and recycled to form at least a part of the transport stream. A preferred method of recycling the vent stream from the disengaging zone 202 to the lift-engager 134 includes a means for compensating for pressure fluctuations in the lift-engager 134, which is useful in applications such as those where the lifting of the catalyst out of the lift engager 134 is intermittent or otherwise not steady. As described above, the pressure drop across the lift conduit 128 fluctuates directly with the catalyst lifting rate—relatively high when the lifting rate is high and relatively low when the lifting rate is low—and so the pressure in the lift-engager 134 fluctuates directly with the pressure drop across the lift conduit 128.

Generally, relatively rapid and large fluctuations in the pressure of the lift-engager 134 should be minimized, or else the flow of the purge stream from the lift-engager 134 to the reactor 110 could fluctuate too. In fact, for example, if the lifting pressure is normally greater than the reactor pressure, a relatively sudden and large drop in the lifting pressure may result in the lifting pressure falling at least momentarily below the reactor pressure, thereby stopping the normal upward flow of the purge stream from the lift-engager 134 to the reactor 110 and risking communication between the fluids of the reactor 110 and the regenerator 180. Where the volume of gas in the recirculating circuit that includes the lift-engager 134 and the disengaging zone 202 is relatively small, the fluctuations that occur in the lifting pressure as a result of changes in the rate of lifting of catalyst particles are compounded.

FIG. 2 illustrates a preferred embodiment of the present invention for supplying the fluid transport stream to the lift-engager 134 by employing a blower 158 and a surge drum 150 to recycle the disengaging zone's vent stream. This preferred embodiment controls the flow of the purge stream from the lift-engager 134 to the reactor 110 by controlling the differential pressure between the lift-engager 134 and the reactor 110. This flow scheme controls the differential pressure between the lift-engager 134 and the reactor 110 while minimizing the potential waste and cost of excessive venting or make-up of lift fluid for the process. The method also has the advantage of being particularly inexpensive in terms of invested capital and construction costs. Referring again to FIG. 2, the vent stream from the disengaging zone 202 passes through the line 170. A make-up stream comprising the lift fluid enters the process through a line 164, a regulating valve 166, and a line 168. The vent stream combines with the make-up stream to form a process stream that passes through a line 162. The process stream combines with a surge stream passing through a line 156 to form a process stream that passes through a line 160 and into a blower 158. The blower 158 compresses the process stream, and the compressed process stream passes through a line 142. The pressure of the suction of the blower 158 is referred to herein as the suction pressure, and the pressure at the discharge of the blower 158 is referred to herein as the discharge pressure. A portion of the compressed process stream passes through the line 128, forms the transport stream, and passes to the lift-engager 134, as described previously. Another portion of the compressed process stream passes through a line 144, a regulating valve 146, and a line 148 into the surge drum 150. The above-mentioned surge stream exits from the surge drum 150, through a line 152, through a regulating valve 154, and through the line 156 to combine with the process stream in the lines 162 and 160.

The manner in which the catalyst transport system illustrated in FIG. 2 is controlled in accordance with the present invention is as follows. The differential pressure instrument 188 provides an output signal 187 which is representative of the desired differential pressure between the disengaging zone 202 and the surge drum 150. The output signal 187 is the setpoint input to a differential pressure controller 174. The other input to the differential pressure controller 174 is an output signal 178 that is representative of the actual differential pressure between the disengaging zone 202 and the surge drum 150. The signal 178 is provided by a differential pressure instrument 176 between the disengaging zone 202 and the surge zone 150. The differential pressure instrument 176 is in communication with the disengaging zone 202 through a pressure tap 186 and with the surge zone 150 through a pressure tap 172. In response to the setpoint signal 187 and the signal 178, the differential pressure controller 174 provides an output signal 140 that is responsive to the difference between the setpoint signal 187 and the signal 178.

The signal 140 splits into two signals, a signal 149, which sets the control valve 146, and a signal 151 which sets the control valve 154. The control valve 146 is operably located between the lines 144 and 148 so as to regulate the flow of the gas stream into the surge drum 150. The control valve 154 is operably located between the lines 152 and 156 so as to regulate the flow of the gas stream out of the surge drum 150.

The differential pressure instrument 116 provides an output signal 117 which is representative of the actual differential pressure across the catalyst-withdrawal conduits 112 between the lift-engager 134 and the reactor 110. The signal 117 sets the control valve 166. The control valve 166 is operably located between the lines 164 and 168 so as to regulate the flow of the make-up gas stream into the process.

The operation of the control system illustrated in FIG. 2 is as follows. The differential pressure between the lift-engager 134 and the reactor 110 is regulated at or near to its desired value by adjusting the positions of the control valves 146, 154, and 166. When, as a result of any of a number of process reasons, such as an increase in lifting rate, the pressure in the lift-engager 134 increases, then the differential pressure between the lift-engager 134 and the reactor 110 increases above its desired value. In addition, the differential pressure between the lift-engager 134 and the disengaging zone 202 increases, and the output signal 187 of the differential pressure instrument 188 increases. In response, the output signal 140 of the differential pressure controller 174 also increases. As the output signal 140 begins to increase, the signal 151 causes the control valve 154 to begin to close. This restricts the flow rate of the surge stream exiting the surge drum 150, thereby raising the pressure in the surge zone 150 relative to the transport stream/lift stream circuit as measured by the differential pressure instrument 176 between the surge zone 150 and the disengaging zone 202. If the output signal 140 continues to increase, the control valve 154 ultimately closes completely and then the signal 149 causes the control valve 146 to begin to open. This increases the flow rate of the portion of the transport stream entering the surge drum 150, thereby further raising the pressure in the surge zone 150 relative to the transport stream/lift stream circuit. If the output signal 140 continues to increase, the control valve 146 ultimately opens completely. There are two effects to this control action. The first effect is, as mentioned above, to increase the pressure in the surge drum 150, thereby increasing the signal 172 to the differential pressure instrument 176, and increasing the signal 178 from the differential pressure instrument 176 to the differential pressure controller 174 to equal the signal 187. The second effect is to decrease the pressure in the transport stream/lift stream circuit, thereby lowering the differential pressure between the lift-engager 134 and the reactor 110 to equal the setpoint of the differential pressure instrument/controller 116. By lowering the differential pressure between the lift-engager 134 and the reactor 110 in this way, the differential pressure is controlled without changing the flow rate of the make-up gas stream in any way. However, if this control scheme is unable to reduce the differential pressure between the lift-engager 134 and the reactor 110 to its desired value, then the differential pressure instrument/controller 116 may cause the flow rate of the make-up gas to decrease. This occurs as a result of an increase in the output signal 117 of the differential pressure instrument/controller 116, which causes the control valve 164 to begin to close. This decreases the flow rate of the make-up gas stream entering the transport stream/lift stream circuit, thereby reducing the pressure in the transport stream/lift stream circuit and ultimately decreasing the differential pressure between the lift-engager 134 and the reactor 110.

Conversely, when the pressure in the lift-engager 134 decreases, then the differential pressure between the lift-engager 134 and the reactor 110 decreases below its desired value, the differential pressure between the lift-engager 134 and the disengaging zone 202 decreases, and the output signal 187 of the differential pressure instrument 188 decreases. In response, the output signal 140 of the differential pressure controller 174 decreases, and the signal 149 causes the control valve 146 to begin to close. This lowers the pressure in the surge zone 150 relative to the transport stream/lift stream circuit as measured by the differential pressure instrument 176. If the output signal 140 continues to decrease, the control valve 146 ultimately closes completely and then the signal 151 causes the control valve 154 to begin to open. This further lowers the pressure in the surge zone 150 relative to the transport stream/lift stream circuit. If the output signal 140 continues to increase, the control valve 154 ultimately opens completely. This has the dual effects of lowering the signal 178 to equal the signal 187 and raising the differential pressure between the lift-engager 134 and the reactor 110 to equal the setpoint of the differential pressure instrument/controller 116. Again, as described above, the differential pressure between the lift-engager 134 and the reactor 110 is raised without changing the flow rate of the make-up gas stream. However, the differential pressure instrument/controller 116 may raise the flow rate of the make-up gas as a result of a decrease in the output signal 117 which causes the control valve 166 to close, thereby decreasing the differential pressure between the lift-engager 134 and the reactor 110.

In this manner, the fluctuations in the lifting pressure may be minimized, the fluctuations in the flow rate of the make-up gas stream may be minimized, and the flow rate of the make-up gas stream may be maintained substantially constant. The range of flow rate of the make-up gas stream is between 0.01 and 10.0 times the average flow rate of the make-up gas stream. Preferably, the range of flow rate of the make-up gas stream is between 0.1 and 3.0 times the average flow rate of the make-up gas stream.

What is claimed is:

1. A method of transferring solid particles in at least semi-continuous flow from a first zone containing a first fluid to a second zone containing a second fluid while inhibiting communication of said fluids, which method comprises the steps of:
   a) withdrawing an effluent stream comprising said solid particles and said first fluid via gravity-flow from said first zone;
   b) passing said effluent stream into a purge zone;
   c) passing a purged effluent stream comprising said solid particles from said purge zone and into a lift zone;
   d) passing a transport stream comprising a lift fluid into said lift zone;
   e) passing a purge stream comprising said lift fluid from said lift zone and through said purge zone countercurrent to said effluent stream at a rate that is not less than that effective to purge said first fluid from the total void volume in said purge zone and less than that effective to terminate the flow of solid particles through said purge zone;

f) passing a purge zone exit stream comprising said lift fluid and said first fluid from said purge zone and into said first zone, and rejecting a first stream comprising said lift fluid from said first zone;

g) passing a lift stream comprising said lift fluid and said solid particles from said lift zone at a velocity of said lift fluid effective to lift said solid particles out of said lift zone and into a lift conduit;

h) passing said lift stream through said lift conduit and into said second zone; and i) rejecting a second stream comprising said lift fluid from said second zone.

2. The method of claim 1 further characterized in that said purge zone operates at purging conditions including a residence time of said solid particles therein of between 0.1 and 60 minutes.

3. The method of claim 1 further characterized in that at least a portion of said solid particles in said purge zone forms at least intermittently a packed bed of solid particles.

4. The method of claim 1 further characterized in that the velocity of said purge stream in said purge zone is less than the velocity effective to fluidize said solid particles.

5. The method of claim 1 further characterized in that said purge zone comprises a conduit.

6. The method of claim 1 further characterized in that said first zone operates at a first pressure and said lift zone operates at a lifting pressure that is not less than said first pressure.

7. The method of claim 1 further characterized in that said lift zone operates at a lifting pressure and said second zone operates at a second pressure that is less than said lifting pressure.

8. The method of claim 1 further characterized in that said first fluid comprises at least one of hydrogen and hydrocarbon said second fluid comprises oxygen and said lift fluid comprises molecular nitrogen.

9. A method of transferring solid particles in at least semi-continuous flow from a first zone containing a first fluid to a second zone containing a second fluid while inhibiting communication of said fluids, which method comprises the steps of:

a) withdrawing an effluent stream comprising said solid particles and said first fluid via gravity-flow from said first zone;

b) passing said effluent stream into a purge zone;

c) passing a purged effluent stream comprising said solid particles from said purge zone and into a lift zone;

d) passing a transport stream comprising a lift fluid into a lift zone;

e) passing a purge stream comprising said lift fluid from said lift zone and through said purge zone countercurrent to said effluent stream at a rate that is not less than that effective to purge said first fluid from the total void volume in said purge zone and less than that effective to terminate the flow of solid particles through said purge zone;

f) passing a purge zone exit stream comprising said lift fluid and said first fluid from said purge zone and into said first zone, and rejecting a first stream comprising said lift fluid from said first zone;

g) passing a lift stream comprising said lift fluid and said solid particles from said lift zone at a velocity of said lift fluid effective to lift said solid particles out of said lift zone and into a lift conduit;

h) passing said lift stream through said lift conduit and into a third zone;

i) passing an outlet stream comprising said solid particles from said third zone and into said second zone; and j) rejecting at least one of a third stream comprising said lift fluid from said third zone and a second stream comprising said lift fluid from said second zone.

10. The method of claim 9 further characterized in that said third stream is rejected from said third zone and said third stream comprises all of said lift fluid of said lift stream.

11. The method of claim 9 further characterized in that said second stream is rejected from said second zone and said second stream comprises all of said lift fluid of said lift stream.

12. The method of claim 9 further characterized in that said outlet stream passes from said third zone to said second zone through a withdrawal conduit and at least a portion of said solid particles in said outlet stream forms at least intermittently a packed bed of said solid particles in said withdrawal conduit.

13. The method of claim 9 further characterized in that said third zone is a fluid-solid disengaging zone operating at disengaging conditions effective to separate the entering lift stream into said outlet stream and said third stream that is rejected from said fluid-solid disengaging zone.

14. The method of claim 9 further characterized in that said third stream comprising said lift fluid is rejected from said third zone and said transport stream comprises a portion of said third stream.

15. The method of claim 14 further characterized in that said transport stream comprises at least a portion of a make-up stream that is at conditions including a flow rate and that comprises said lift fluid.

16. The method of claim 15 further characterized in that said third stream is gaseous.

17. The method of claim 16 further characterized in that a portion of said third stream is combined with a surge stream to form a process stream comprising said lift fluid at a suction pressure that is compressed to a discharge pressure and is separated into a first portion of said process stream which forms at least a portion of said transport stream and a second portion of said process stream that is passed at least intermittently into a surge zone from which said surge stream is at least intermittently passed so that the flow rate of said make-up stream is substantially constant.

18. The method of claim 17 further characterized in that the range of flow rate of said make-up stream is between 0.01 and 10.0 times the average flow rate of said make-up stream.

19. A method of transferring catalyst particles in at least semi-continuous flow from a first zone containing a first fluid comprising at least one of hydrogen and a hydrocarbon to a second zone containing a second fluid comprising oxygen while inhibiting communication of the fluids of said first zone and said second zone, which method comprises the steps of:

a) withdrawing an effluent stream comprising said catalyst particles and at least one of hydrogen and a hydrocarbon via gravity-flow from said first zone;

b) passing said effluent stream into a purge zone;

c) passing a purged effluent stream comprising said catalyst particles from said purge zone and into a lift zone;

d) passing a transport stream comprising nitrogen into said lift zone;

e) passing a purge stream comprising nitrogen from said lift zone and into said purge zone countercurrent to said effluent stream at a rate that is not less than that effective to purge at least one of hydrogen and a hydrocarbon from the total void volume in said purge zone and less than that effective to terminate the flow of catalyst particles through said purge zone;

f) passing a purge zone exit stream comprising nitrogen and at least one of hydrogen and a hydrocarbon from said purge zone and into said first zone, and rejecting a first stream comprising nitrogen from said first zone;

g) passing a lift stream comprising nitrogen and said catalyst particles from said lift zone at a velocity of nitrogen effective to lift said catalyst particles out of said lift zone and into a lift conduit;

h) passing said lift stream through said lift conduit and into a fluid-solid disengaging zone operating at disengaging conditions effective to separate the entering lift stream into a third stream comprising nitrogen and an outlet stream comprising said catalyst particles and nitrogen;

i) withdrawing said outlet stream from said fluid-solid disengaging zone through a withdrawal conduit, forming at least intermittently a moving packed bed of said catalyst particles in said withdrawal conduit, and passing said outlet stream into said second zone;

j) rejecting a second stream comprising nitrogen from said second zone;

k) combining a portion of said third stream with a make-up gas stream that is at conditions including a flow rate and that comprises nitrogen to form a first process stream;

l) combining said first process stream with a surge stream to form a second process stream;

m) compressing said second process stream and separating the compressed second process stream into a first portion of said second compressed process stream and a second portion of said compressed second process stream;

n) forming said transport stream from said first portion of said compressed second process stream, and o) passing said second portion of said compressed second process stream at least intermittently into a surge zone and passing said surge stream therefrom at least intermittently so that the flow rate of said make-up stream is substantially constant.

20. The method of claim 19 further characterized in that the differential pressure between said first zone and said lift zone is controlled to reduce fluctuations in the flow rate of said make-up gas, said method comprising the steps of:

a) establishing a first signal representative of the desired differential pressure between said fluid-solid disengaging and said surge zone;

b) establishing a second signal representative of the actual differential pressure between said fluid-solid disengaging zone and said surge zone;

c) comparing said first signal and said second signal and establishing a third signal, wherein said third signal is responsive to the difference between said first signal and said second signal;

d) establishing a fourth signal which is responsive to said third signal, wherein said fourth signal positions a first valve operably located so as to control the flow of said second portion of said second process stream;

e) establishing a fifth signal which is responsive to said third signal, wherein said fifth signal positions a second valve operably located so as to control the flow of said surge stream;

f) establishing a sixth signal representative of the actual differential pressure between said first zone and said lift zone;

g) establishing a seventh signal representative of the desired differential pressure between said first zone and said lift zone and;

h) comparing said sixth signal and said seventh signal and establishing an eighth signal which is responsive to the difference between said sixth signal and said seventh signal, wherein said eighth signal positions a third valve operably located so as to control the flow of said make-up stream.

* * * * *